United States Patent
Sandgren

(10) Patent No.: US 12,143,311 B1
(45) Date of Patent: Nov. 12, 2024

(54) METHODS AND SYSTEMS FOR DYNAMIC AGENT RESOURCE ALLOCATION

(71) Applicant: LIVEPERSON, INC., New York, NY (US)

(72) Inventor: Thorsten Ohrstrom Sandgren, Thornton, CO (US)

(73) Assignee: LIVEPERSON, INC., New York, NY (US)

(*) Notice: Subject to any disclaimer, the term of this patent is extended or adjusted under 35 U.S.C. 154(b) by 0 days.

(21) Appl. No.: 18/639,209

(22) Filed: Apr. 18, 2024

Related U.S. Application Data

(60) Provisional application No. 63/460,665, filed on Apr. 20, 2023.

(51) Int. Cl.
  *H04L 47/70* (2022.01)
(52) U.S. Cl.
  CPC .................. *H04L 47/82* (2013.01)
(58) Field of Classification Search
  CPC ...... H04L 47/82; H04L 41/50; H04L 41/0896
  USPC ........................................................ 709/226
  See application file for complete search history.

(56) References Cited

U.S. PATENT DOCUMENTS

| | | | | |
|---|---|---|---|---|
| 8,560,365 B2* | 10/2013 | Friedlander | ............ | G16H 30/20 |
| | | | | 705/7.12 |
| 9,003,019 B1* | 4/2015 | Guo | ............ | G06Q 30/06 |
| | | | | 709/224 |
| 9,497,136 B1* | 11/2016 | Ramarao | ............... | G06F 9/5072 |
| 10,084,665 B1* | 9/2018 | Arunachalam | ......... | H04L 67/52 |
| 10,223,647 B1* | 3/2019 | Ward, Jr. | ................. | G06F 9/48 |
| 10,470,085 B2* | 11/2019 | Mascarenhas | ........ | H04W 12/06 |
| 11,765,100 B1* | 9/2023 | Sloane | ................... | H04L 47/83 |
| | | | | 709/226 |
| 2013/0044694 A1* | 2/2013 | Aguirre | ................. | H04W 28/16 |
| | | | | 370/329 |
| 2017/0195994 A1* | 7/2017 | Cole | ..................... | G06Q 20/326 |
| 2018/0095664 A1* | 4/2018 | Walsh | ..................... | G06F 3/067 |
| 2021/0174281 A1* | 6/2021 | Bhaskara | ............ | G06F 11/0712 |

\* cited by examiner

Primary Examiner — Ruolei Zong
(74) Attorney, Agent, or Firm — POLSINELLI LLP

(57) ABSTRACT

A load-balancing system can provide dynamic allocation of distributed resources to one or more communication interfaces. The load-balancing system may receive an indication that a value of a resource is less than a threshold. The value may represent a quantity of resources associated with a communication network. The load-balancing system may transmit a request for resources to a set of computing device. The load-balancing system may receive an identification of a subset of the set of computing devices that approve the request for the resources and facilitate allocation of the resources associated with the subset of the set of computing devices to the communication network by causing a connection to be established between the subset of the set of computing devices and the communication network.

20 Claims, 7 Drawing Sheets

600

```
┌─────────────────────────────────────────────────────────────────────────┐
│ Receiving an indication that a value of resources is less than a        │
│ threshold, the value of the resources value representing a quantity of  │
│ resources associated with a communication network of a domain          │
│                                  604                                    │
└─────────────────────────────────────────────────────────────────────────┘
                                    │
                                    ▼
┌─────────────────────────────────────────────────────────────────────────┐
│ Transmitting, to a set of computing devices, a request for resources    │
│ associated with the set of computing devices, the request including an  │
│ identifier of the domain                                                │
│                                  608                                    │
└─────────────────────────────────────────────────────────────────────────┘
                                    │
                                    ▼
┌─────────────────────────────────────────────────────────────────────────┐
│ Receiving an identification of a subset of the set of computing devices │
│ that approve the request for the resources                              │
│                                  612                                    │
└─────────────────────────────────────────────────────────────────────────┘
                                    │
                                    ▼
┌─────────────────────────────────────────────────────────────────────────┐
│ Facilitating allocation of the resources associated with the subset of  │
│ the set of computing devices to the communication network by causing a  │
│ connection to be established between the subset of the set of computing │
│ devices and the communication network                                   │
│                                  616                                    │
└─────────────────────────────────────────────────────────────────────────┘
```

FIG. 6

METHODS AND SYSTEMS FOR DYNAMIC AGENT RESOURCE ALLOCATION

CROSS REFERENCE TO RELATED APPLICATIONS

The present patent application claims the benefit of priority to U.S. Provisional Patent Application No. 63/460,665 filed Apr. 20, 2023, which is incorporated herein by reference in its entirety for all purposes.

TECHNICAL FIELD

This disclosure generally relates to dynamic resource allocation; and more specifically to dynamically allocating agent resources based on impact events.

BACKGROUND

Systems that provide services to large sets of users, may leverage resources of a set of processing devices to manage a processing load on the system. In some instances, systems may attempt to allocate a minimum quantity of resources for a threshold quality of service. Operating with the minimum quantity of resources may reduce operating expenses but risk reducing the quality of service when processing loads change unexpectedly. In some instances, systems may address variations in processing loads by monitoring the processing load over time to identify trends of higher or lower processing loads. The system may then allocate more resources when the processing load is anticipated to be higher and fewer resources when the processing load is anticipated to be lower. For example, a first system that provides multimedia services may have a higher processing load on evenings, weekends and the summer months (e.g., when users have more available time to stream media). The first system may then allocate more resources during the nights, weekends, and over the summer months to reduce the processing load. However, problems may arise when the processing load increases unexpectedly (e.g., due to an unanticipated event, network or processing errors, etc.).

SUMMARY

Methods and systems are described herein for dynamically allocating agent resources to communication networks. The methods include: receiving an indication that a value of a resource is less than a threshold, the value of the resource representing a quantity of resources associated with a communication network of a domain; transmitting, to a set of computing devices, a request for resources associated with the set of computing devices, the request including an identifier of the domain; receiving an identification of a subset of the set of computing devices that approve the request for the resources; and facilitating allocation of the resources associated with the subset of the set of computing devices to the communication network by causing a connection to be established between the subset of the set of computing devices and the communication network Systems are described herein for dynamically allocating agent resources to communication networks. The systems include one or more processors and a non-transitory computer-readable medium storing instructions that, when executed by the one or more processors, cause the one or more processors to perform any of the methods as previously described.

Non-transitory computer-readable media are described herein for storing instructions that, when executed by the one or more processors, cause the one or more processors to perform any of the methods as previously described.

These illustrative examples are mentioned not to limit or define the disclosure, but to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

FIG. 6 illustrates a flowchart of an example process of dynamic agent resource allocation in communication networks according to aspects of the present disclosure.

DETAILED DESCRIPTION

Figure 1:
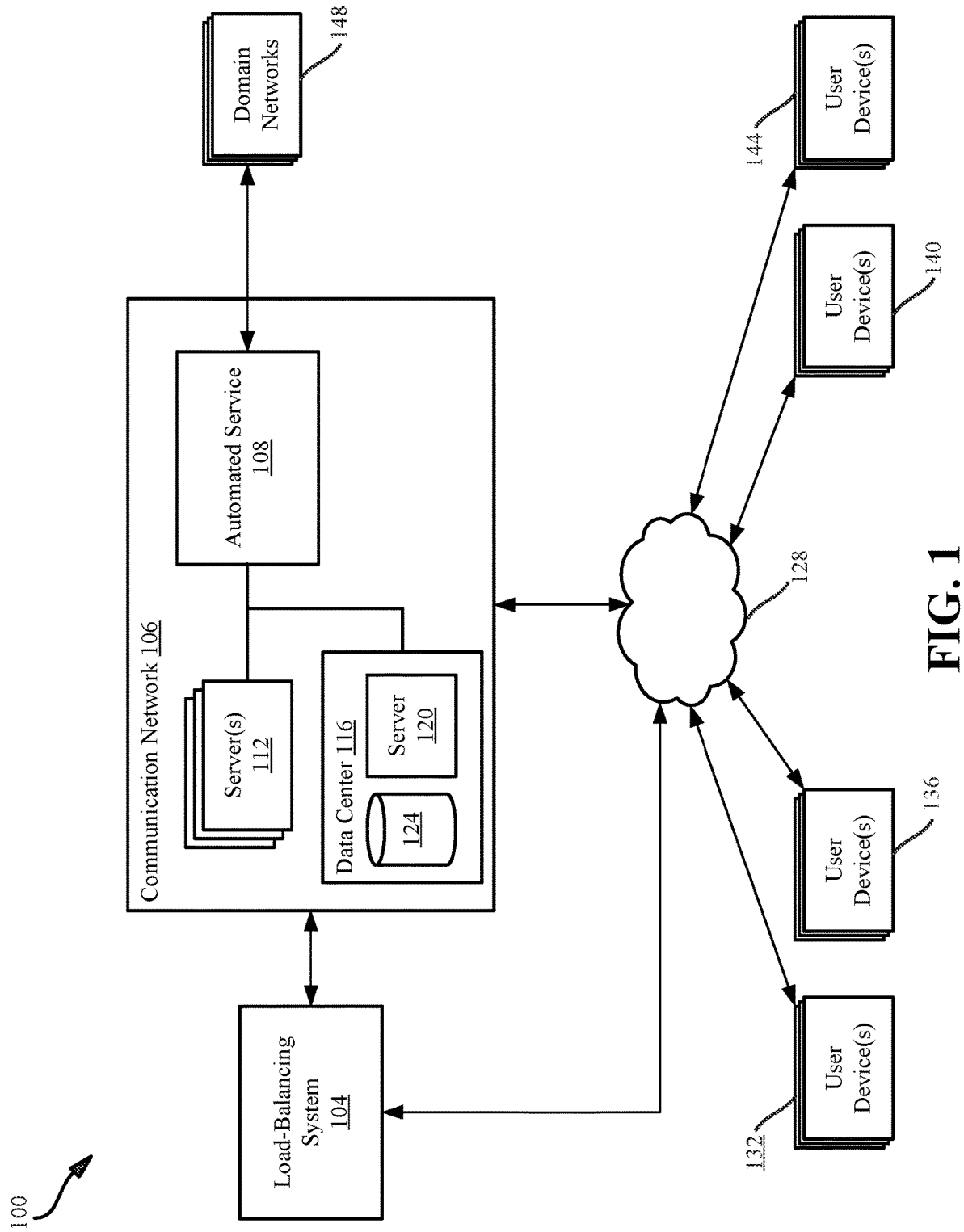
FIG. 1 illustrates a block diagram of an example system in dynamic agent resource allocation system configured to dynamically scale access to agent resources for a communication network according to aspects of the present disclosure.

A communication network (e.g., such as call center, a cloud network, or the like that provides communication services for a domain such as a business) may utilize resources of a set of terminal devices to facilitate communications between the communication network and user devices regarding a client. Allocating additional processing resources, such as additional terminal devices, may take a significant amount. For example, terminal device may need to be powered on, provisioned with hardware and/or software if a terminal device does not meet certain minimum requirements, connected to the communication network, and connected to a job queue through which processing resources of the terminal device can be utilized by the communication network. To reduce the resource-allocation latency between detecting a need for additional processing resources and receiving additional processing resources, the communication network may use machine-learning models to predict the processing load of the communication network over time and proactive allocate additional processing resources prior to an anticipated increase in demand. For example, the communication network may use historical processing loads to predict future processing loads of the communication network and allocates processing resources accordingly. If the communication network predicts a low processing load but actually detects a high processing load, the communication network the resource-allocation latency may cause additional jobs to be stored in the job queue, delaying the execution of jobs and degrading the performance of the communication network.

The present disclosure includes systems and methods for load-balancing communication networks using dynamically allocated distributed resources. A load-balancer (e.g., operating within or external to a communication network) can dynamically identify and facilitate the allocation of distributed resources to a communication network to reduce or eliminate a resource-allocation latency occurring during unexpected changes in processing loads. In some examples, the load-balancer may include a hierarchical resource detection and acquisition system configured to first identify potential processing resources within the communication network (e.g., operating in same or proximate physical location as the communication network, connected to the communication network directly or indirectly, etc.), then identifying potential processing resources external to the communication network (e.g., operating in remote from the physical location as the communication network, disconnected from the communication network, etc.).

Communication networks may include variety of device types (e.g., desktop or laptop computers, mobile devices such as smartphones or tables, servers, databases, etc.). Each device type may include and/or be usable to provide processing resources usable by the communication network to execute jobs of the communication network. In some instances, the jobs may include facilitating communications between a user device (e.g., operated by a user) and a terminal device (e.g., operated by an agent of the communication network), a user device and an automated service (e.g., software bot configured to communicate with users and agents using natural language communications via text or synthetic speech), a terminal device and an automated service, etc. As used herein, processing resources may refer to components of terminal devices (e.g., central processing unit cycles, memory capacity and/or bandwidth, network bandwidth, etc.) and/or to the agents configured to operate terminal devices. As used herein, a job may refer to communication session facilitated by the communication network between a user device and a terminal device or between a user device and an automated service.

The load-balancer may identify terminal devices within the communication network and/or remote from the communication network that can reduce an impact of an unexpected change of a processing load of the communication network. In some instances, the load-balancer may transmit a notification to one or more terminal devices (e.g., push notifications, email, text messaging, etc.), configured to notify the terminal device of the unexpected change in processing load. In response to the notification, the terminal device may connect to the communication network to execute jobs of the communication network. The notification may include additional information associated with the status of the communication network such as, but not limited to, a current processing load of the communication network (e.g., percent of processing resources currently utilized, a quantity of jobs queued for execution, etc.), a quantity of terminal devices requested to connected to the communication network, a quantity of terminal devices that already have connected to the communication network (e.g., updated in real-time or as of the transmission of the notification, etc.), a quantity of processing resources requested, a time interval over which the terminal device is requested to connect to the communication network, a quantity of terminal devices which received the notification, a value to be distributed to the terminal device (or agent thereof) in exchange for connecting to the communication network and executing jobs (e.g., determined based on the degree in which the processing resources unexpectedly changed, the quantity of terminal devices currently connected to the communication network, the current processing load, the current job queue, combinations thereof, or the like), combinations thereof, or the like. The load-balancer may transmit the notification to more terminal devices than is needed to reduce the unexpected change in the processing load of the communication network (e.g., as some terminal devices that receive the notification may not connected when requested, etc.) to increase the likelihood that a predetermined quantity of terminal devices and/or processing resources will be connected to the communication network.

In some instances, the load-balancer may expose interfaces configured to provide information and functionality associated with one or more communication networks. The interface may be accessible using an application executed by terminal devices. Alternatively, or additionally, the interfaces may be accessible via a web-interface for devices that may not have the application installed or may not have sufficient processing resources to execute the application. The interface may provide, for each communication network managed by the load balancer, one or more of: a request for terminal devices to connect to a communication network, a current processing load of the communication network (e.g., percent of processing resources currently utilized, a quantity of jobs queued for execution, etc.), a quantity of terminal devices requested to connected to the communication network, a quantity of terminal devices that already have connected to the communication network (e.g., updated in real-time or as of the transmission of the notification, etc.), a quantity of processing resources requested, a time interval over which the terminal device is requested to connect to the communication network, a quantity of terminal devices which received the notification, a value to be distributed to the terminal device (or agent thereof) in exchange for connecting to the communication network and executing jobs (e.g., determined based on the degree in which the processing resources unexpectedly changed, the quantity of terminal devices currently connected to the communication network, the current processing load, the current job queue, combinations thereof, or the like), and/or the like. Terminal devices, through the interface, may accept or decline a request to provide processing resources to a communication network.

If the terminal device accepts the request to provide processing resources, the terminal device may transmit a communication to the load balancer and the communication network associated with the request indicating acceptance of the request. The terminal device may then connect to the communication network to provide the processing resources of the terminal device to the communication network. The load balancer may update the information of the interface based on the communication from the terminal device (e.g., in real time, in regular interfaces, etc.) such as, the state of the communication network, the quantity of terminal devices connected to the communication network, the value that the communication network may provide to subsequent terminal devices that accept the request to provide processing resources, etc. Once connected, the terminal device may begin executing jobs of the communication network. The jobs may correspond to communication session between an agent of the terminal device and a user device connected to the communication network or a communication session between the user device and an automated service of the communication network. The automated service may execute on the terminal device. Alternatively, or additionally, the automated service may be a distributed service that is executed by the communication network and/or the terminal device. In some examples, a job may correspond to a sequence of operations that can be executed by a device to generate an output that can be transmitted to the communication network. The sequence of operations may be an independent portion of a larger processing task (e.g., such as an application, data processing, artificial intelligence, supercomputing, etc.)

In an illustrative example, a computing device of a load-balancing system may receive an indication that a value of one or more resources is less than a threshold. A value of a resource may represent a quantity of resources associated with a communication network of a domain. For example, the value of a resource may correspond to a quantity of terminal devices connected to the communication network, a quantity of processing resources of being utilized by the communication network, a quantity of jobs in a job queue, a rate at which jobs are being executed relative to a total quantity of scheduled jobs, a rate in which jobs are being received or generated, combinations thereof, or the like.

The load-balancing system may provide load-balancing services to one or more communication networks based on real-time resource consumption and/or historical resource consumption metrics of the one or more communication networks. In some instances, the load-balancing may generate predictions of future resource consumption (e.g., using a machine-learning model, statical analysis, etc.) to provide proactively allocate resources of the one or more communication networks and/or to dynamically identify and allocate processing resources during time intervals of unexpected changes in processing loads. The load-balancing system may receive the real-time resource consumption and/or historical resource consumption metrics from the communication networks via an exposed interface (e.g., such as an application programming interface or graphical user interface, etc.), a data stream, upon transmitted a request, etc.

The load-balancing system may facilitate a transmission to a set of computing devices (e.g., terminal devices such as, but not limited to, desktop or laptop computers, smartphones, tablets, servers, telephones, etc.) including request for resources associated with the set of computing devices. The devices of the set of computing devices may be homogeneous (e.g., of a same type, include a same hardware and/or software, or the like) or heterogenous (e.g., of one or more different types, include various types of hardware and/or software, and/or the like). Each computing device of the set of computing devices may be operated by a distinct agent configured to provide services to one or more communication networks and/or one or more domains. The request for resources may include information associated with the request including, but not limited to, an identifier of the domain, an identifier of the communication network, a current processing load of the communication network (e.g., percent of processing resources currently utilized, a quantity of jobs queued for execution, etc.), a quantity of computing devices requested to connected to the communication network, a quantity of computing devices that have already connected to the communication network (e.g., updated in real-time or as of the transmission of the notification, etc.), a quantity of processing resources requested, a time interval over which the computing devices is requested to connect to the communication network, a quantity of computing devices which received the notification, a value to be distributed to the computing device (or agent thereof) in exchange for connecting to the communication network and executing jobs (e.g., determined based on the degree in which the processing resources unexpectedly changed, the quantity of computing devices currently connected to the communication network, the current processing load, the current job queue, combinations thereof, or the like), and/or the like.

In some instances, causing the request for resources to be presented on an interface (e.g., a graphical user interface, etc.) exposed to the set of computing device. For example, the set of computing devices may execute an application enabling communication between the computing device and one or more communication networks managed by the load-balancing system. The load-balancing system may modify the interface to include the request for resources such that when a computing device of the set of computing devices access the interface of the application, the request for resources may be presented. The application may enable computing devices of the set of computing devices to receive information associated with the one or more communication networks, requests for resources and any details associated therewith (as previously described), etc. Computing devices of the set of computing devices may interact with the one or more communication networks and/or the load-balancer by, for example, accepting a request for resources (e.g., facilitating the allocation of resources associated with the computing device to the requesting communication network, connect to a communication network of the one or more communication networks, transmit communications to and receive communications from a communication network of the one or more communication networks, transmit communications to and receive communications from the load-balancing system, and/or the like. Alternatively. or additionally, facilitating the transmission may include transmitting a communication (e.g., by the load-balancing system, the communication network associated with the request for resources, another device, etc.) the request for resources to the set of computing devices (e.g., push notifications, email, telephone, text messaging, video conference, etc.).

The load-balancing system may receive an identification of a subset of the set of computing devices that approve the request for the resources. In some instances, the subset of the set of computing devices may transmit a notification to the load-balancing system indicating that a respective computing device accepts the request for the resources. Alternatively, or additionally, the subset of the set of computing devices may allocate the resources to the communication network, and the communication network may transmit a notification to the load-balancer including an identification of the subset of the set of computing devices and an identification of the resources allocated. In other instances, the subset of the set of computing devices may transmit a communication through the application accepting the request for resources.

The load-balancer may then facilitate allocation of the resources associated with the subset of the set of computing devices to the communication network by causing a connection to be established between the communication network and each of the subset of the set of computing devices. In some instances, the load-balancer may cause the connection to be established through the application executing on the set of computing devices. In other instances, the subset of the set of computing devices may connect to the communication network through a separate application, an interface, a webservice, or the like. Once connected, the subset of the set of computing devices may provide the requested resources by, for example, executing jobs of the communication network (e.g., by establishing a communication session with a user device that connected to the communication network to resolve a query, problem, etc. associated with the domain), enabling the communication network to execute instructions using resources of a computing device of the subset of the set of computing devices, enabling the communication network to execute an automated service configured to communicate with user devices connected to the communication network, and/or the like.

FIG. 1 illustrates a block diagram of an example dynamic resource allocation system configured to dynamically scale access to distributed resources for a communication network according to aspects of the present disclosure. Dynamic resource allocation system 100 may manage resources for one or more communication networks and/or domains. Dynamic resource allocation system 100 may include load-balancing system 104 that facilitates the identification and allocation of a distributed set of processing resources. Load-balancing system 104 may include one or more devices (e.g., computing devices, terminal devices, etc.), that store information associated with a set of terminal devices that are registered with load-balancing system 104. Terminal device may be a device (e.g., computing device, mobile device, telephone, etc.) operated by an agent configured to provide communication services to a domain through a communication network. In some instances, a terminal device may be configured to provide services to a single communication network and/or domain. In other instances, terminal devices may provide services to one or more communication networks and/or domains.

Load-balancing system 104 may be connected to one or more communication networks 106 that provide services for domain networks 148. Communication network 106 may facilitate communications between a terminal device and a user device (e.g., user devices 132-144, etc.) to provide services of a domain network 148 to the user device 140. For instance, user device 132 may connect to communication network 106 to execute a query (e.g., such as an account status of an account of user device 132 with domain network 148, information associated with a product or service provided by domain network 148, provide payment, request products or services of domain network 148, etc.). Communication network. 106 may connect user device 132 to a terminal device operating within communication network 106 or to a terminal device allocated to communication network 106 by load-balancing system 104.

Alternatively, communication network 106 may connect user device 132 to an automated service (e.g., automated service 108 operating within communication network 106 or an automated service operating on a terminal device allocated to communication network 106 by load-balancing system 104, etc.). Automated services may be configured to provide communication services using natural language communications via text, synthetic speech, video (e.g., via an animated avatar, or the like), etc. Automated service may be configured to execute queries, provide information, assist agents communicating with user devices by providing suggested communications and/or responses, executing functions of communication network 106 (e.g., for terminal devices, load-balancing system 104, user devices, etc.). Automated services may obtain information associated with domain networks 148 stored in database 124 of datacenter 116.

Communication network 106 may include one or more servers 112, datacenter 116 (e.g., which may include server 120 and database 124), and one or more terminal devices operated by agents. When user devices connected to communication network 106 (e.g., through network 128 such as the Internet, a telecommunications network, a cloud network, a private network, etc.), communication network 106 may generate a job and add the job to a job queue. One or more servers 112 may operate a scheduler configured to distribute jobs to terminal devices operating within communication network 106 and/or allocated to communication network 106. The scheduler may predict a rate in which new jobs may be generated by communication network 106 over time using current resource consumption metrics, and historical resource consumption metrics. For example, the scheduler may operate a machine-learning model (e.g., a neural network, a cluster-based model, etc.) configured to predict the size of the job queue, a growth rate of the job queue, resource consumption of the communication network (e.g., based on the job queue, central processing unit utilization, memory utilization, network bandwidth utilization, etc.).

In some instances, the status of the processing resources of communication network 106 may change unexpectantly (e.g., such as a press release associated with domain network 148, system failure of communication network 106, etc.) causing a sudden increase in the quantity of user devices (e.g., user devices 132-144, etc.) attempting to connect to communication network 106 or an inability of communication network 106 to execute jobs at the rate in which new jobs are being added to the job queue. In those instances, communication network 106 may be unable to reduce the job queue causing user devices to wait for longer and longer time intervals or disconnect from communication network 106. Load-balancing system 104 may monitor the status of processing resources of communication network 106 (e.g., as received from one or more servers 112, scheduler, etc.) in real time or near real time. When load-balancer 104 detects a resource consumption is greater than a threshold (as defined by communication network 106, domain networks 148, user input, etc.), load-balancing system may identify a set of terminal devices registered with load-balancing system 104 and configured to provide resources to communication network 106 and/or the particular domain network 148 that communication network 106 is providing service for. Load-balancing system 104 may then request resources from the set of terminal devices for communication network 106 using direct communications (e.g., push notifications, text messaging, telephone commination, email, etc.) or indirect communication (e.g., modifying an interface of an application executed by the set of terminal devices to present the request when accessed by the set of terminal devices, etc.).

A subset of the set of terminal devices may respond to the request for resources by connecting directly to communication network 106 and/or by notifying load-balancer 104. Once connected to communication network 106, the subset of the set of terminal devices may allocate the resources of the subset of the set of terminal devices to communication network 106 to execute jobs in a same manner as those terminal devices that operate within communication network 106. Scheduler may distribute jobs to the set of terminal devices, distribute processing tasks (e.g., discrete sequences of operations executable by a terminal device), execute an instance of an automated service configured to execute jobs, etc.

Figure 2:
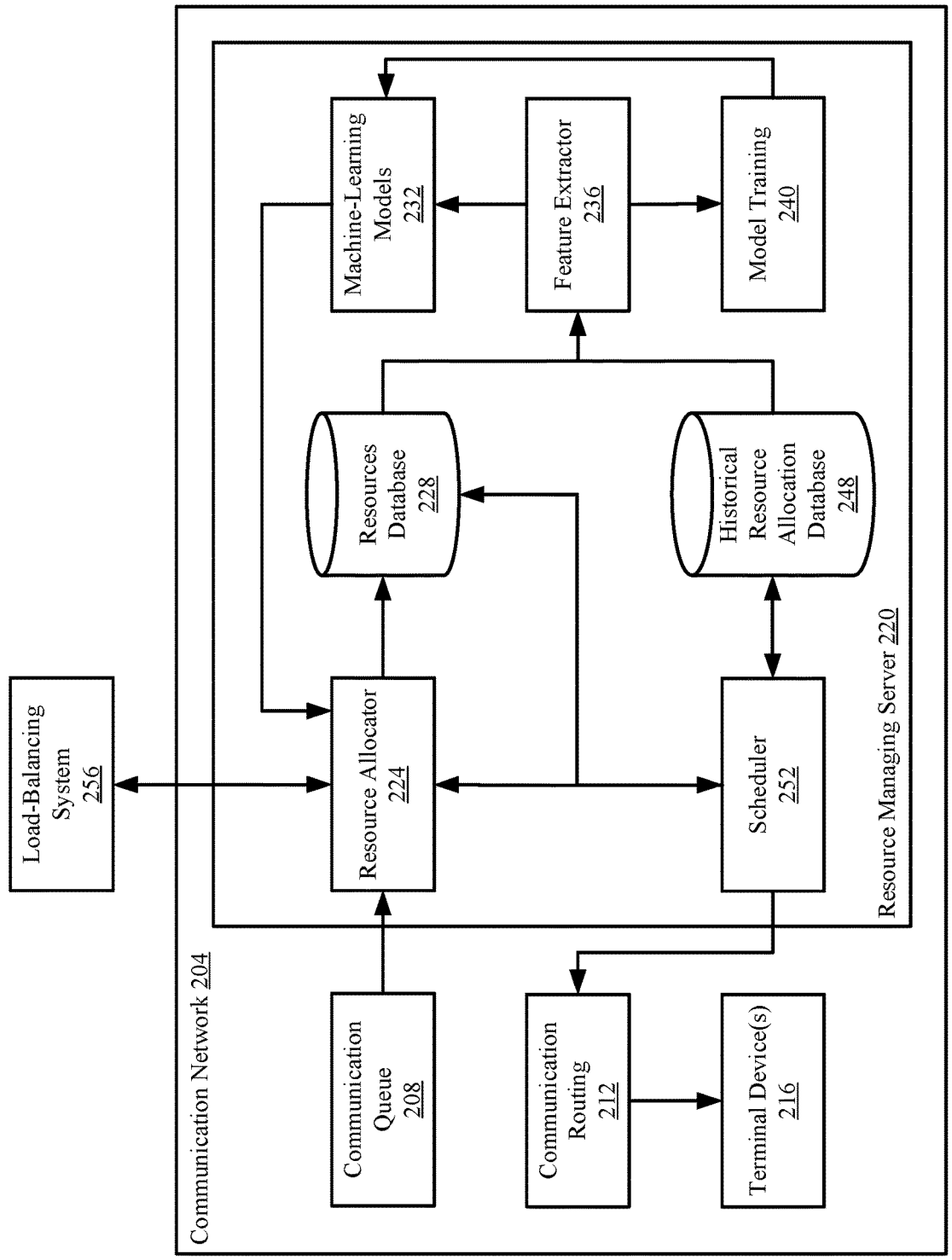
FIG. 2 illustrates a block diagram of an example communication network configured to manage communications for a varying quantity of concurrently connected devices without compromising quality metrics according to aspects of the present disclosure.

FIG. 2 illustrates a block diagram of an example communication network configured to manage communications for a varying quantity of concurrently connected devices without compromising quality metrics according to aspects of the present disclosure. Communication network 204 may be an example implementation of communication network 106 of FIG. 1 or may be another communication network. Communication network 204 may operate communication queue 208 (e.g., a job queue), that stores an identification of user devices connected to communication network 204 that are awaiting a communication session with a terminal device and/or an automated service. Communications from communication network 204 may be routed by communication routing 212 to a terminal device 216 or automated service to establish a communication session for the user device. Communication queue 208 may be connected to resource managing server 220 configured to manage the processing resources of communication network 204.

Resource managing server 220 may include resource allocator 224 configured to allocate the processing resources of communication network 204. The processing resources may include central processing unit cycles, memory (e.g., volatile and non-volatile memories), network bandwidth, etc. and communication services (e.g., provided by automated services, agents, etc.). Processing resources may be consumed by facilitating communication sessions, executing automated services, executing other operations (e.g., data processing, etc.). Communication services may be consumed when an automated service or a terminal device is allocated to a user device for a communication session and thereby cannot be allocated to other user devices or facilitate the execution of other jobs of communication network 204, Resource allocator 224 may access resources database 228 that stores an identification of and references to resources available to communication network 204. Resource allocator 224 may also receive input from machine-learning models 232 configured to predict future resource consumption of communication network 204 to enable resource allocator 224 to proactively allocate resources before expected increases in resource consumption of communication network 204.

Machine-learning models 232 may be a classifier (e.g., configured to classify a predicted future processing load according to discrete categories such as, but not limited to, a support vector machine, Naïve Bayes, K-nearest neighbors, neural networks, decision trees, etc.), a clustering-based model (e.g., neural network or other model using K-means, density-based spatial clustering of applications with noise, random forest, a gaussian mixture model, balance iterative reducing and clustering using hierarchies, affinity propagation, mean-shift, ordering points to identify the clustering structure, agglomerative hierarchy, spectral clustering, or the like), and/or the like. In some instances, machine-learning models 232 may include one or more ensemble models (of one or more machine-learning models).

Feature extractor 236 may receive information from resources database 228 (e.g., such as information associated with resources in use by and/or available to communication network. 204, etc.) and/or from historical resource allocation database 248 (e.g., such as information associated with historical resource consumption metrics, etc.). Feature extractor 236 may define one or more feature vectors for machine-learning models 232 for training and regular operations. Model training 240 may direct feature extractor 236 to define feature vectors that include features from both resources database 228 and historical resource allocation database 248. The feature vectors may be aggregated into training datasets usable to train machine-learning models 232.

Machine-learning models 232 may be trained using supervised learning, unsupervised learning, semi-supervised learning, reinforcement learning, a combination thereof, or the like, the type of training may be selected based on a particular model to be trained and whether a training feature vector includes labels (e.g., for supervised learning). For example, a classifier such as a support vector machine can be trained using a combination of supervised learning and reinforcement learning. Model training 240 may training machine-learning models 232 for a predetermined time interval, over a predetermined quantity of iterations, until one or more accuracy metrics are reached (e.g., such as, but not limited to, accuracy, precision, area under the curve, logarithmic loss, F1 score, mean absolute error, mean square error, etc.), and/or the like. Once trained, model training 240 may continue to monitor accuracy metrics and/or other metrics of machine-learning models 232 (e.g., in real time or each time machine-learning models 232 generates a prediction or output, etc.). Machine-learning models 232 may be continually trained using reinforcement learning in regular intervals, upon detecting an event (e.g., such as when an accuracy metric falls below a threshold, a particular prediction or output, a confidence value, etc.), or the like. In some instances, model training 240 may determine to instantiate a new machine-learning model 232 based on the one or more accuracy metrics (e.g., such as when one or more accuracy metrics fall below a threshold, etc.).

Once machine-learning models 232 are trained, feature extractor 236 may generate feature vectors using resource database 228 and a state of resource consumption of communication network 204. The feature vector may be passed as input into machine-learning models 232 to predict resource consumption of communication network 204 at some time instant or time interval in the future. The predicted resource consumption may be passed to resource allocator 224, which may use the current resource consumption of communication network 204 and the predicted future resource consumption of communication network 204 to allocate available resource (as identified by resources database 228). Resource allocator 224 may determine a quantity of terminal devices and/or other processing devices to allocate to the communication queue to ensure that communication sessions are terminated at a rate that is equal to or greater than the rate in which the communication queue is growing. Resource allocator 224 may transmit requests for additional resources to external terminal devices (e.g., terminal devices or agents that are not located within communication network 204). The external terminal devices may connect to communication network 204 and register with resource managing server 220 to allocate the resources of the external terminal devices (e.g., processing resources and/or communication resources) to communication network 204.

Resource allocator 224 may transmit an identification of allocatable resources to scheduler 252. Scheduler 252 may use the identification of allocatable resources to scheduler 252 and information from historical resource allocation database 248 to determine how to schedule communication sessions among the available terminal devices, external terminal devices (if present), and/or other processing resources (e.g., servers, CPUs, memory, bandwidth, etc.).

Scheduler 252 may determine which terminal device may receive which job based on historical resource utilization (and/or performance metrics) associated with the terminal device. Scheduler 252 may output an identification of a communication session or job to communication routing 212, which may route a communication to a terminal device 216 (e.g., which may include terminal devices located within communication network 204 and/or external terminal devices, etc.). Terminal device 216 upon receiving an identification of the communication session or job may establish the communication session (e.g., between terminal device 216 and a user device), execute the job, or the like.

In some instances, resource managing server 220 may detect an unexpected change in resource consumption that may be impact services provided by communication network 204. For example, resource managing server 220 may detect a sudden increase in a quantity of user devices requesting to connect (or connected) to communication network 204. Resource allocator 224 may use load-balancing system 256 (e.g., such as load-balancing system 104 of FIG. 1) to identify distributed resources that can be allocated to communication network 204 to alleviate the processing load of communication network 204. Load-balancing system 256 may be an external system (as shown) that can facilitate the allocation of distributed resources for one or more communication networks including communication network 204 or may be an internal system (e.g., such as a component of resource managing server 220 or other server of communication network 204.

Load-balancing system 256 may operate an exchange providing an identification of resource consumption metrics and/or resource requirements of various communication networks including communication network 204. Load-balancing system 256 may identify, for each communication network, an indication as to whether the communication network is requesting additional resources or is operating under a high processing load (e.g., a processing load greater than a threshold, etc.), a quantity of resources requested or needed to reduce the high processing load, a quantity of terminal devices and/or agents requested, a value to be provided to the terminal device and/or agent in exchange for providing resources, a time interval over which resources are requested, a quantity of terminal devices and/or agents that have already accepted the resource request, etc.

Terminal devices may register with load-balancing system 256 to provide services to communication networks. Once registered, when a communication network detects that resource consumption is greater than a threshold (e.g., or a high processing load, which corresponds to a percentage of utilized resources relative to a total quantity of available resources), terminal devices may select the communication network through the exchange and connect to the communication network to allocate the resources of the terminal device to the communication network. Alternatively, when a communication network detects that resource consumption is greater than a threshold (e.g., or a high processing load, which corresponds to a percentage of utilized resources relative to a total quantity of available resources), the communication network and/or load-balancing system 254 may transmit a communication to one or more terminal devices registered to load-balancing system 254 requesting that the one or more terminal devices connect to the communication network and allocate the respective resources of the one or more terminal devices to the communication network.

Figure 3:
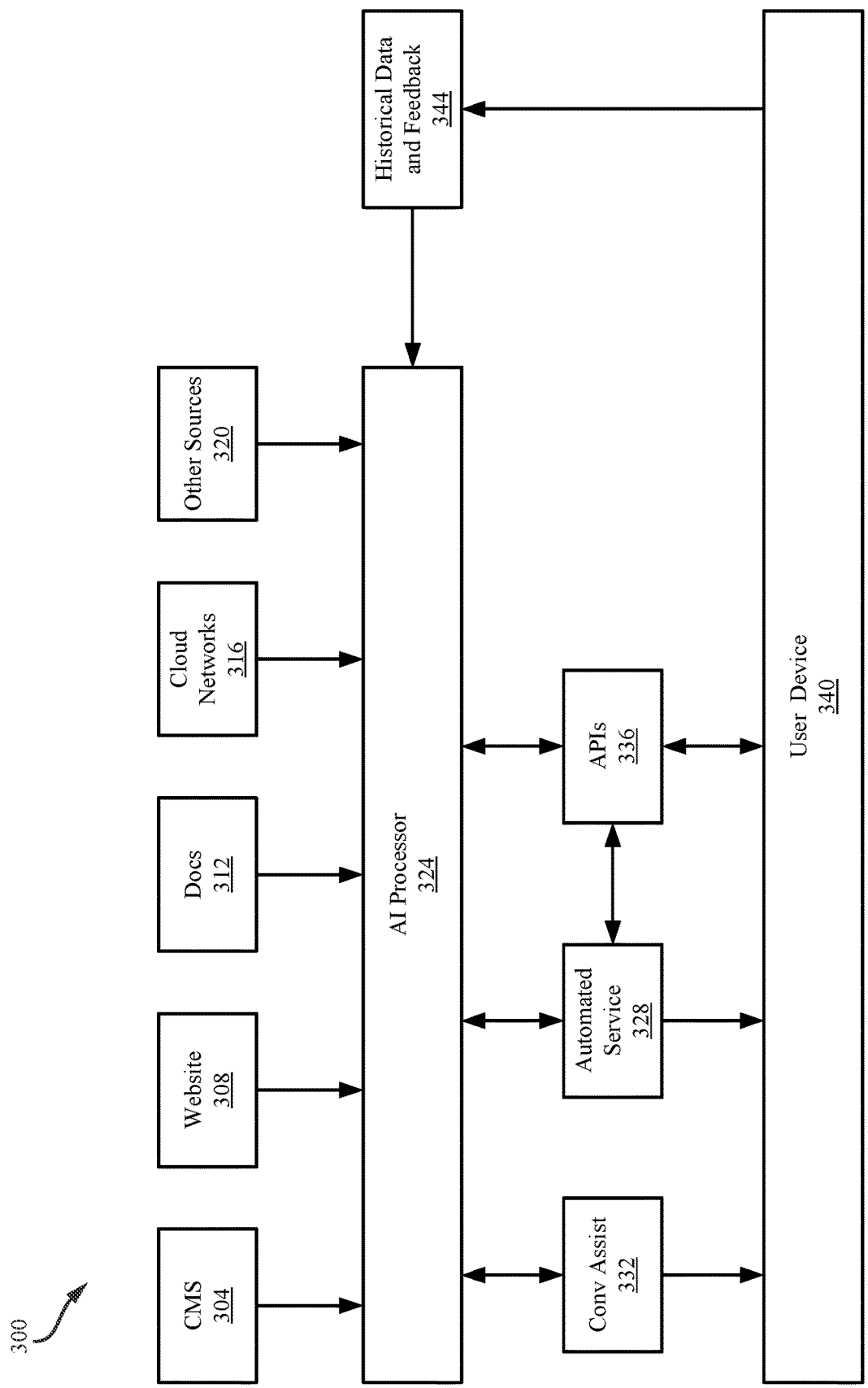
FIG. 3 depicts a block diagram of an example artificial-intelligence data processing system of an automated service configured to automate communications of a communication network according to aspects of the present disclosure.

FIG. 3 depicts a block diagram of an example artificial intelligence data processing system usable with an automated service to assist with and/or automate communications of a communication network according to aspects of the present disclosure. Artificial intelligence data processing system 300 may be configured to facilitate and maintain communications between an agent of a communication network and an automated service, between an agent of a communication network and a user, between a user and an automated service, and/or the like. User devices (e.g., operated by users) may connect to the communication network using a variety of different device types and capabilities to request assistance to perform an action (e.g., execute a query for information, pay a balance, connect to a customer service agent, etc.) that may be represented as a job by the communication network and added to communication queue (e.g., such as communication queue 208 of FIG. 2, etc.). The communication network may facilitate execution of the job using artificial intelligence data processing system 300, which can, for example, automate execution of the job using automated services (e.g., automated service 328) or an application programming interface call (e.g., APIs 336), assist agents and/or users during communication sessions (e.g., conversation assist 332, etc.), etc.

Artificial-intelligence data processing system 300 may be a component of one or more computing devices (e.g., terminal devices, mobile devices, telephones, desktop or laptop computers, servers, databases, etc.) that operate within the communication network. In some instances, multiple artificial-intelligence data processing systems may be instantiated, each including different capabilities and being configured to communicate with different device types and/or users. The communication network may route communications received from a user device to a particular instance of artificial-intelligence data processing system 300 based on a degree in which the instance of artificial intelligence data processing systems 300 matches the user device and/or an availability of the instances of artificial-intelligence data processing system 300. In other instances, an instance of artificial-intelligence data processing system 300 may be a component of one or more computing devices operating separately from the communication network (e.g., such as via external terminal devices, etc.). The one or more computing devices may connect to the communication network to enable the communication network to route communications between a user device and the instance of artificial-intelligence data processing system 300 operating separately from the communication network.

A load-balancing system may dynamically locate and facilitate the allocation of processing resources of computing devices (external to the communication to) to the communication network. The communication network may instantiate an instance of artificial-intelligence data processing systems or any component thereof (e.g., such as just automated service 328 or conversation assist 332, etc.) on the computing devices to increase or decrease the quantity of artificial-intelligence data processing systems available to communicate with user devices connected to the communication network.

Artificial-intelligence data processing system 300 may receive data from a variety of disparate information sources for use training and executing automated services and agents to communicate and provide information to users. Examples of information sources include, but are not limited to, content management systems 304, websites 308, documents 312 (e.g., via a document management system, concurrent versioning system, file system, database, etc.), cloud networks 316, communication networks (e.g., one or more devices configured to facilitate communications over one or more communication channels between users and other users and/or between users and agents), terminal devices (e.g., devices configured to communicate with user devices, etc.), other sources 320 (e.g., analytics services, Internet-of-Things (IoT) devices, databases, servers, any other information source or storage device, etc.), and/or the like. Artificial-intelligence data processing system 300 may receive information from information sources (e.g., databases, websites, local or remote memory of connected devices, etc.), data sources (e.g., from sensors directly connected to artificial-intelligence data processing system 300, from a device including one or more sensors, etc.), The manner in which artificial-intelligence data processing system 300 receives data from data sources 304-120 may be based on the data source. For example, some data sources such as IoT devices may transmit a data stream to which artificial intelligence data processing system 300 may be connected. For some data sources, artificial-intelligence data processing system 300 may transmit a request for particular data and/or for datasets stored by a data source. Artificial-intelligence data processing system 300 may transmit requests in regular intervals (e.g., such as a batch request to one or more data sources, etc.), upon detecting or being notified of new data, and/or the like. For some data sources, artificial intelligence data processing system 300 may use one or more APIs exposed by a data source to access data generated or stored by data source. For some data sources, artificial-intelligence data processing system 300 may instantiate a process configured to scrape data from a data source (e.g., such as web crawler, etc.). The process may execute to access and transmit data of a data source to artificial-intelligence data processing system 300. In some instances, data sources may transmit data to artificial-intelligence data processing system 300 each time new data is generated and/or stored by the data source.

Data of a data source can include any type of information. Some data may correspond to information associated with an object, entity, or topic, that may be requested by a user. Some data sources may store records, documents, files, or the like. For example, a data source may store a record of a conversation (e.g., in an audio format, alphanumeric format, or the like) between a user and an agent. Another data sources may store sensor data from one or more connected sensors (e.g., such as motion sensors, temperature sensors, etc.).

Data from data sources may be received by AI processor 324. AI processor 324 may be configured to process the data into a format usable by one or more conversation services (e.g., automated services 328, conversation assist 332, APIs 336, and/or the like) and/or information-distribution services. AI processor 324 may include one or more devices, processes, machine-learning models, and/or the like configured to process received data. AI processor 324 may store the received data so as to store the sematic information of any received data regardless of the data type of the received data.

AI processor 324 may preprocess the data to convert the received data into one or more general formats usable by AI processor 324. AI processor 324 may identify a data type associated with the received data (e.g., based on identifying audio data, video data, alphanumeric strings, a particular file type extension, etc.) and allocate a process and/or machine-learning model capable of processing the identified data type. For example, if the received data includes audio segments from voice communications, AI processor 324 may allocate a machine-learning model configured to process audio segments into alphanumeric strings (e.g., a speech-to-text translation, audio classification, etc.). For video segments AI processor 324 may allocate machine-learning models configured to classify images, perform object detection, etc. AI processor 324 may then store the preprocessed data.

In some instances, AI processor 324 may augment the preprocessed data by adding additional features corresponding to contextual information, metadata, etc. For example, AI processor 324 may identify contextually relevant information based on, but not limited to, information associated with the origin device from which the data was transmitted and/or a user thereof (e.g., such as, but not limited to, demographic information, location information, an identification of hardware and/or software included within the origin device, an Internet Protocol (IP) address, a media access control address (MAC), etc.), information associated with the communication that included the information (e.g., such as an IP address, a MAC address, an identification of an origin location of the communication, an identification one or more servers through which the communication traveled, a data size, a quantity of packets, a packet size, etc.), information associated with preceding or subsequently received data, information associated with linked data (e.g., data referenced by the data to be stored, or data that references the data to be stored, etc.), and/or the like. AI processor 324 may extract features from the augmented data to add to the preprocessed data. Alternatively, or additionally, AI processor 324 may determine which features to add to the preprocessed data based on a classification of the data to be stored (e.g., such as audio or text-based conversation data, video data, information data, etc.).

AI processor 324 may receive requests for information from automated service 328, conversation assist 332, and APIs 336. Automated service 328 may include one or more processes, machine-learning models, and/or devices configured to communicate with user devices, terminal devices, other device, and/or other automated services. Automated service 328 may communicate with user device 340 over a communication channel through a communication network. During a communication session, automated service 328 may receive a communication from user device 340 and generate and transmit a response to the user device 340 using a same or communication type as the received communication. In some instances, automated services 328 may be configured to communicate in a manner such that a user of user device 340 (or an agent of a terminal device, etc.) may not detect that automated service 328 is not a human. For example, automated service 328 may be configured to generate responses that are based on a same orthography and/or communication convention (e.g., language, diction, grammar, slang, abbreviations, etc.) as used by the user or agent. Alternatively, automated service 328 may be configured to generate responses that are based on an orthography and/or communication convention commonly used for the communication channel of the communication session and demographic information associated with the user or agent (e.g., location of the user or agent, age, etc.).

Automated service 328 may be configured to communicate over an audio interface (e.g., a telephone call, etc.), a video interface (e.g., video conference, etc.), one or more textual interfaces (e.g., text messaging, instant messaging, email, direct messaging, and/or the like), or the like. Automated service 328 may request information from AI processor 324 during a communication session with a user and/or other automated service. For example, during the communication session, a user may ask a question. Automated service 328 may parse the question to determine a question type, identify information that will resolve the question, an interface type of the interface through which automated service 328 is communicating with the user or other automated service, and/or one or more contextually relevant features that may increase an accuracy of the response that will be generated by automated service 328. Automated service 328 may then execute a query to automated processor 328 for the information.

AI processor 324 may receive the query and identify one or more potential responses each including data that may correspond to the requested information. In some instances, AI processor 324 may generate a confidence value for each of the one or more potential responses that include the requested information. The confidence value may be generated based on a degree in which the potential responses matches the query (e.g., based on a quantity of features of the potential responses that correspond to the query, or the like). AI processor 324 may then rank the one or more potential responses and identify a particular potential response having a highest confidence value. Alternatively, AI processor 324 may identify a set of potential responses of the one or more potential responses having a confidence value greater than a threshold.

AI processor 324 may then translate the particular potential response (or the set of potential responses) into a representation that can be transmitted via the communication channel connecting user device 320 to automated service 328. For example, if the user is communicating with automated service 328 via a telephonic interface (e.g., voice-based communications, etc.), then AI processor 324 may translate the particular potential response into one or more alphanumeric strings that include a conversational representation of the information with a diction, grammar, etc. that is conventional to telephonic communications. AI processor 328 may then translate the one or more alphanumeric strings into a synthetic voice representation that may be presented to the use by automated service 328. Alternatively, AI processor 324 may pass the one or more alphanumeric strings to automated service 328 and automated service may generate the synthetic voice representation of the one or more alphanumeric strings (e.g., using a speech-to-text process, machine-learning model, etc.).

In some instances, automated services 328 may include a sequence of machine-learning models that operate together to process incoming communications, generate responses, and transmit the responses to the user or agent over the same communication channel over which the incoming communications were received. The machine-learning models may be trained using training datasets derived from data received by AI processor 324 that corresponds to communications transmitted over communication channels. Each training dataset may include a sequence (e.g., ordered) or set (e.g., unordered) of data usable to train a particular machine-learning model (e.g., recurrent neural network, Naive Bayes, etc.) to generate a target output (e.g., predictions, classifications, image processing, audio processing, video processing, natural language processing, etc.).

In some instances, additional features may be added to the training datasets to augment the semantic meaning of the data of the training datasets and/or to provide context usable by the automated service to generate subsequent communications. The additional data may correspond to features extracted from other portions of the training dataset, features associated with a source of the training datasets (e.g., features that correspond to a data source or device, features that identify the data source, etc.), features associated with a user that generated or is associated with the data of the training datasets, an identification of a data type of the data of the training datasets, a timestamp corresponding to when the data of the training datasets was generated and/or received, combinations thereof, or the like.

AI processor 324 may select one or more training datasets for each machine-learning model based on the target output for that machine-learning model. The communication network may the modify the training datasets to optimally train a particular machine-learning to generate a particular target output.

The AI processor 324 may then train the machine-learning models to generate a target output. The one or more machine-learning models may be trained over a training time interval that may be based on a predetermined time interval or based on a target accuracy of the machine-learning model. For example, the training time interval may begin when training begins and end when a target accuracy metric is reached (e.g., accuracy, precision, area under the curve, logarithmic loss, F1 score, mean absolute error, mean square error, etc.). The machine-learning models may be trained using supervised learning, unsupervised learning, semi-supervised learning, reinforcement learning, combinations thereof, or the like. The type of training to be used may be selected based on the type of machine-learning model being trained. For instance, a regression model may use supervised learning (or a variation thereof), while a clustering model may be trained using unsupervised learning (or a variation thereof), etc. Alternatively, the type of learning may be selected based on the target output and/or a type or quality of the training data available to train the machine-learning models.

Once the one or more machine-learning models are trained, the co AI processor 324 may define processes and/or interfaces configured to connect the one or more machine-learning models to enable a single input to generate an output expected by user device 340. For example, a query may be received over a telephony communication channel. The processes and/or interfaces enable the one or more machine-learning models to operate together to, for example: translate the query into natural language text using a speech-to-text machine-learning model, process the natural language text using a natural language machine-learning model into an executable query (e.g., in a structured query language, format processable by another machine-learning model, etc.), execute the query to generate a response, convert the response to natural language text using the natural language machine-learning model or another machine-learning model, convert the text to speech using a text-to-speech machine-learning model, etc. Alternatively, one or more of the aforementioned machine learning models or algorithms may be combined into a single machine-learning model. The processes and/or interfaces may enable the output of one machine-learning model to be used as input into another machine-learning model by processing the output into a different form or format (e.g., if needed) and into a format expected by a next machine-learning model in the sequence. The AI processor 324 may define multiple processes and/or interfaces to organize the one more machine-learning models into difference sequences configured to process different forms of communication (e.g., speech, gesture-based communications, data, text, etc.) received over different communication channels (e.g., videoconference, telephone, text, data, etc.). As a result, each of the processes and/or interfaces may structure the one or more machine-learning models in various configurations and sequences based on the communication channel and communications transmitted over the communication channel.

Conversation assist 332 may include one or more processes and/or devices configured to assist a human agent during a communication session between a user and an agent or automated service 328 and an agent. Conversation assist 332 may be an automated service with a modified output layer that presents one or more outputs of an automated service to the human agent. The human agent may then select an output from the one or more outputs and present it to the user. As a result, during a communication session, conversation assist 332 may operate in a same or similar manner as automated service 328.

For example, conversation assist 332 may analyze received communications from a user or automated service 328 that is communicating with the agent to determine one or more appropriate responses to the received communications. Conversation assist 324 may transmit queries to AI processor 324 for information needed to generate particular responses (in a same or similar manner as previously described). AI processor 324 may identify the potential responses storing the information and translate the information into a format native to the communication channel of the communication session. When a response is defined, conversation assist 332 may present the response to the agent as a suggested response. The response may include a simplified response such as a shorthand that can be translated by the agent into a conversational response. Alternatively, the response may be presented as a formal conversation response (e.g., including a particular sentence structure, wording/phrasing, grammar, punctuation, etc. that is native to the communication network being used). The agent may select from among one or more suggested responses to present a suggested response to the user or automated service 328. Alternatively, the agent may present a response defined by the agent. The response may be presented to the user as if the response was generated by the agent (e.g., the agent may speak the response or the response may be written out as if from the agent, etc.).

In instances in which multiple responses are generated, conversation assist 332 may rank or score each response so as to provide the agent with options that may be selectively presented over the communication session. The rank or scores may be based on one or more algorithms configured to maximize a probability that particular event will occur (e.g., such as resolving a user issue or complaint, providing a response to a query, causing the user to sign up for a service, causing the user to generate a new profile, cause the user to purchase an item, etc.). A score may include a probability value corresponding to the probability that a particular event may occur if a particular response is selected, an indication in which the probability value will change if a particular response is selected, etc.

APIs 336 may include a set of interfaces exposed to user device 340, automated services 328, and/or other devices authorized to access AI processor 324. The set of interfaces may allow user device 340 to execute functions of AI processor 324, such as, but not limited to establishing communications between user device 340 and other devices or services, establish connection contexts, modify connection contexts, execute queries for information stored, etc. The APIs may be wrapped within an application configured to execute functions of the APIs. Alternatively, the application may connect to APIs 336 or execute remote calls to the functions of APIs 336. The application may include graphical user interfaces and/or command line interfaces that enable user device 340 to selectively execute the functions of APIs 336. APIs 336 may include one or more APIs accessible via different interface types usably by user device 340.

In some instances, APIs may be accessible to devices operating within a same communication network as AI processor 324 (e.g., terminal devices, etc.). Devices outside the communication network may lack the capability and/or authorization to access APIs. External devices may connect to automated service 328 and request the execution of functions of AI processor 324. Automated service 328 may receive the request, determine if the request should be authorized (e.g., based on the requesting device and/or a user thereof, etc.), and define one or more function calls from APIs 336 that will implement the requested functionality.

User device 340 may generate one or more metrics corresponding to the communication session between user device 340 and/or an agent thereof and a user device and/or a user thereof, user device 340 and automated service 328, automated service 328 and another automated service 328, user device 340 operating conversation assist 332 and a user device or automated service 328, user device 340 and AI processor 324 via APIs 336, a user device and automated service 328, and/or any other communications of a service involving AI processor 324. The one or more metrics may be manually generated (e.g., by a user, agent, or the like) and/or automatically generated (e.g., by a communication application, automated service 328, conversation assist 332, AI processor 324, etc.) based on the occurrence of events during the communication session, an analysis of communications transmitted and/or received, a satisfaction of the user or agent, etc. For example, the one or more metrics may include an indication of an accuracy of a response to a communication transmitted by a user or agent (e.g., indicating a degree with which AI processor 324 identified the correct information), a degree in which communications conformed to the communication channel used for the communication session (e.g., indicating whether communications used an appropriate conversational standard associated with the communication channel), and/or the like. The one or more metrics may be transmitted to historical data and feedback 344.

Historical data and feedback. 344 may store records of communication sessions (e.g., the one or more metrics, communications transmitted to and/or received by user device 340, feedback from the user, feedback from the agent, feedback from the automated service 328, and/or the like) between user device 340 and user devices. Historical data and feedback 344 may use the records of one or more communication sessions to define one or more feature vectors usable to train the machine-learning models of AI processor 324. The feature vectors may be used for reinforcement learning and/or to train new machine-learning models based on the historical communications and the one or more metrics and/or feedback generated from those communications. In some instances, labels may be derived from the one or more metrics and/or feedback generated from the communications for supervised learning, semi-supervised learning, reinforcement learning, etc.). Machine-learning models may be trained for predetermined time interval, for a predetermined quantity of iterations, until a predetermined accuracy metric (e.g., accuracy, precision, area under the curve, logarithmic loss, F1 score, mean absolute error, mean square error, etc.) is reached, and/or the like. The one or more metrics and/or feedback may be used to determine an on-going quality of the output of a machine-learning model. If the one or more metrics and/or feedback indicate that the quality of a machine-learning model is below a threshold, then historical data and feedback 344 may retrain the machine-learning model, instantiate and train a new machine, learning model, and/or the like.

In some instances, the feature vectors may be used for reinforcement learning and/or other types of on-going learning. In those instances, a trained machine-learning model used during a communication session to generate a response (e.g., by translating a data into a conversational response native to a particular communication channel), may execute a reinforcement-learning iteration using the feature vector used to generate the response, the one or more metrics, and one or more thresholds to qualify the one or more metrics. The reinforcement-learning iteration may adjust internal weights of the machine learning model to bias the machine learning model towards or away from generating particular responses. If the one or more metrics associated with a response are high relative to the one or more thresholds (e.g., indicating the response is correlated with a good or accurate result), then reinforcement learning may bias the machine-learning model to generate responses similar to that response. If the one or more metrics associated with a response are low relative to the one or more thresholds (e.g., indicating the response is correlated with a poor or inaccurate result), then reinforcement learning may bias the machine-learning model to generate responses different from that response.

Figure 4:
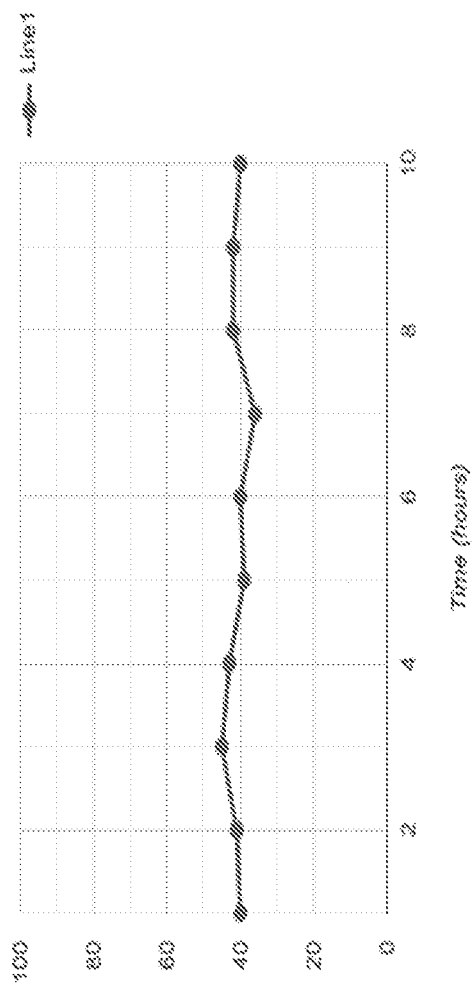
FIG. 4 illustrates a graph of a predicted quantity of concurrently connected devices to a communications interface over time according to aspects of the present disclosure.

FIG. 4 illustrates a graph of a predicted quantity of concurrently connected devices to a communication network over time according to aspects of the present disclosure. Graph 400 illustrates a size of a communication queue over time during regular operations of a communication interface. The size of the communication queue may be indicative of a quantity of resources consumed by the communication network. As shown, the variation in the size of the communication queue may vary minimal over time in part due to the proactive allocation of processing resources (e.g., based on predicted resource consumption, etc.).

Figure 5:
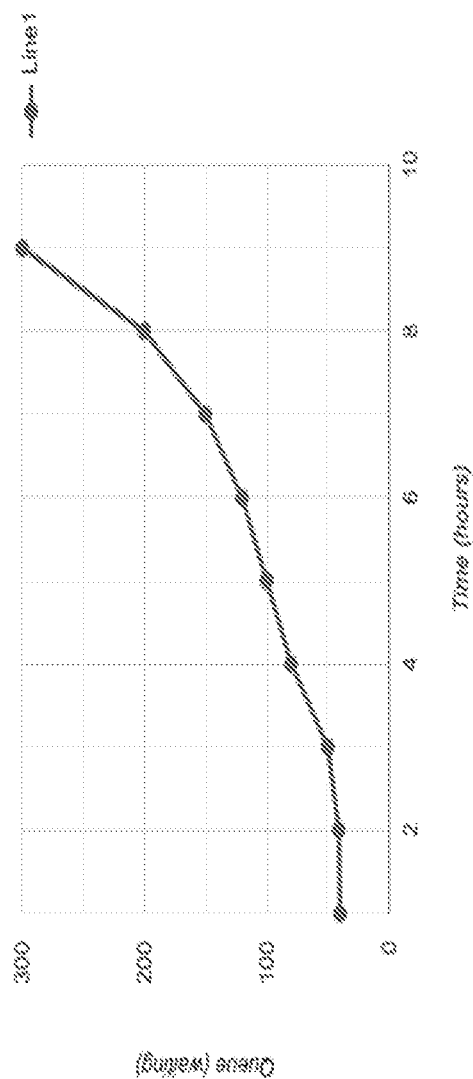
FIG. 5 illustrates a graph of a predicted quantity of concurrently connected devices to a communications interface over time according to aspects of the present disclosure.

FIG. 5 illustrates a graph of a predicted quantity of concurrently connected devices to a communication network over time according to aspects of the present disclosure. In some instance, an event may result in an unexpected quantity of user devices attempting to connect to the communication network. For example, a product recall may cause an increase in the quantity of user devices attempting to connect to the communication network to address the recall, obtain additional information, etc. As the quantity of currently connected user devices increases, the resources consumed by the communication network may increase (e.g., approximately linearly) until the quantity of concurrently connected devices is greater than the quantity of resources available to the communication network. When the quantity of concurrently connected devices is greater than the quantity of resources available to the communication network, the communication queue (e.g., which user devices may be connected to before being scheduled for a connection to a terminal device or automated service) may grow at a higher rate than the communication network can satisfy user devices (e.g., at a higher rate than the rate in which user devices are disconnecting from the communication network). Once the queue begins to grow beyond a threshold rate, the growth of the queue may become exponential as shown by graph 500. The resulting delay may cause user devices to disconnect or degrade the quality of service provided by the communication network.

The load-balancing system, as described herein, can dynamically identify external devices configured to allocate resources to the communication network ad hoc to address unexpected changes in resource consumption of the communication network.

FIG. 6 illustrates a flowchart of an example process of dynamic agent resource allocation in communication networks according to aspects of the present disclosure. At block 604, a device of a load-balancing system may receive an indication that a value of one or more resources is less than a threshold. A value of a resource may represent a quantity of resources associated with a communication network of a domain. For example, the value of a resource may correspond to a quantity of terminal devices connected to the communication network, a quantity of processing resources of being utilized by the communication network, a quantity of jobs in a job queue, a rate at which jobs are being executed relative to a total quantity of scheduled jobs, a rate in which jobs are being received or generated, combinations thereof, or the like.

The load-balancing system may provide load-balancing services to one or more communication networks based on real-time resource consumption and/or historical resource consumption metrics of the one or more communication networks. In some instances, the load-balancing may generate predictions of future resource consumption (e.g., using a machine-learning model, statical analysis, etc.) to provide proactively allocate resources of the one or more communication networks and/or to dynamically identify and allocate processing resources during time intervals of unexpected changes in processing loads. The load-balancing system may receive the real-time resource consumption and/or historical resource consumption metrics from the communication networks via an exposed interface (e.g., such as an application programming interface or graphical user interface, etc.), a data stream, upon transmitted a request, etc.

At block 608, the load-balancing system may facilitate a transmission to a set of computing devices (e.g., terminal devices such as, but not limited to, desktop or laptop computers, smartphones, tablets, servers, telephones, etc.) including request for resources associated with the set of computing devices. The devices of the set of computing devices may be homogeneous (e.g., of a same type, include a same hardware and/or software, or the like) or heterogenous (e.g., of one or more different types, include various types of hardware and/or software, and/or the like). Each computing device of the set of computing devices may be operated by a distinct agent configured to provide services to one or more communication networks and/or one or more domains. The request for resources may include information associated with the request including, but not limited to, an identifier of the domain, an identifier of the communication network, a current processing load of the communication network (e.g., percent of processing resources currently utilized, a quantity of jobs queued for execution, etc.), a quantity of computing devices requested to connected to the communication network, a quantity of computing devices that have already connected to the communication network (e.g., updated in real-time or as of the transmission of the notification, etc.), a quantity of processing resources requested, a time interval over which the computing devices is requested to connect to the communication network, a quantity of computing devices which received the notification, a value to be distributed to the computing device (or agent thereof) in exchange for connecting to the communication network and executing jobs (e.g., determined based on the degree in which the processing resources unexpectedly changed, the quantity of computing devices currently connected to the communication network, the current processing load, the current job queue, combinations thereof, or the like), and/or the like.

In some instances, causing the request for resources to be presented on an interface (e.g., a graphical user interface, etc.) exposed to the set of computing device. For example, the set of computing devices may execute an application enabling communication between the computing device and one or more communication networks managed by the load-balancing system. The load-balancing system may modify the interface to include the request for resources such that when a computing device of the set of computing devices access the interface of the application, the request for resources may be presented. The application may enable computing devices of the set of computing devices to receive information associated with the one or more communication networks, requests for resources and any details associated therewith (as previously described), etc. Computing devices of the set of computing devices may interact with the one or more communication networks and/or the load-balancer by, for example, accepting a request for resources (e.g., facilitating the allocation of resources associated with the computing device to the requesting communication network, connect to a communication network of the one or more communication networks, transmit communications to and receive communications from a communication network of the one or more communication networks, transmit communications to and receive communications from the load-balancing system, and/or the like. Alternatively, or additionally, facilitating the transmission may include transmitting a communication (e.g., by the load-balancing system, the communication network associated with the request for resources, another device, etc.) the request for resources to the set of computing devices (e.g., push notifications, email, telephone, text messaging, video conference, etc.).

At block 612, the load-balancing system may receive an identification of a subset of the set of computing devices that approve the request for the resources. In some instances, the subset of the set of computing devices may transmit a notification to the load-balancing system indicating that a respective computing device accepts the request for the resources. Alternatively, or additionally, the subset of the set of computing devices may allocate the resources to the communication network, and the communication network may transmit a notification to the load-balancer including an identification of the subset of the set of computing devices and an identification of the resources allocated. In other instances, the subset of the set of computing devices may transmit a communication through the application accepting the request for resources.

The subset of the set of computing devices may each be operated by independent agents. Alternatively, the subset of the set of computing devices may be operated by agents associated with a service. In those instances, the service may identify computing devices of the set of computing devices that are both associated with the service and configured to allocate resources to the communication network for the load-balancer. Once identified, the service may respond to the resource request on behalf of the subset of the set of computing devices.

At block 616, the load-balancer may facilitate allocation of the resources associated with the subset of the set of computing devices to the communication network by causing a connection to be established between the communication network and each of the subset of the set of computing devices. In some instances, the load-balancer may cause the connection to be established through the application executing on the set of computing devices. In other instances, the subset of the set of computing devices may connect to the communication network through a separate application, an interface, a webservice, or the like. Once connected, the subset of the set of computing devices may provide the requested resources by, for example, executing jobs of the communication network (e.g., by establishing a communication session with a user device that connected to the communication network to resolve a query, problem, etc. associated with the domain), enabling the communication network to execute instructions using resources of a computing device of the subset of the set of computing devices, enabling the communication network to execute an automated service configured to communicate with user devices connected to the communication network, and/or the like.

Figure 7:
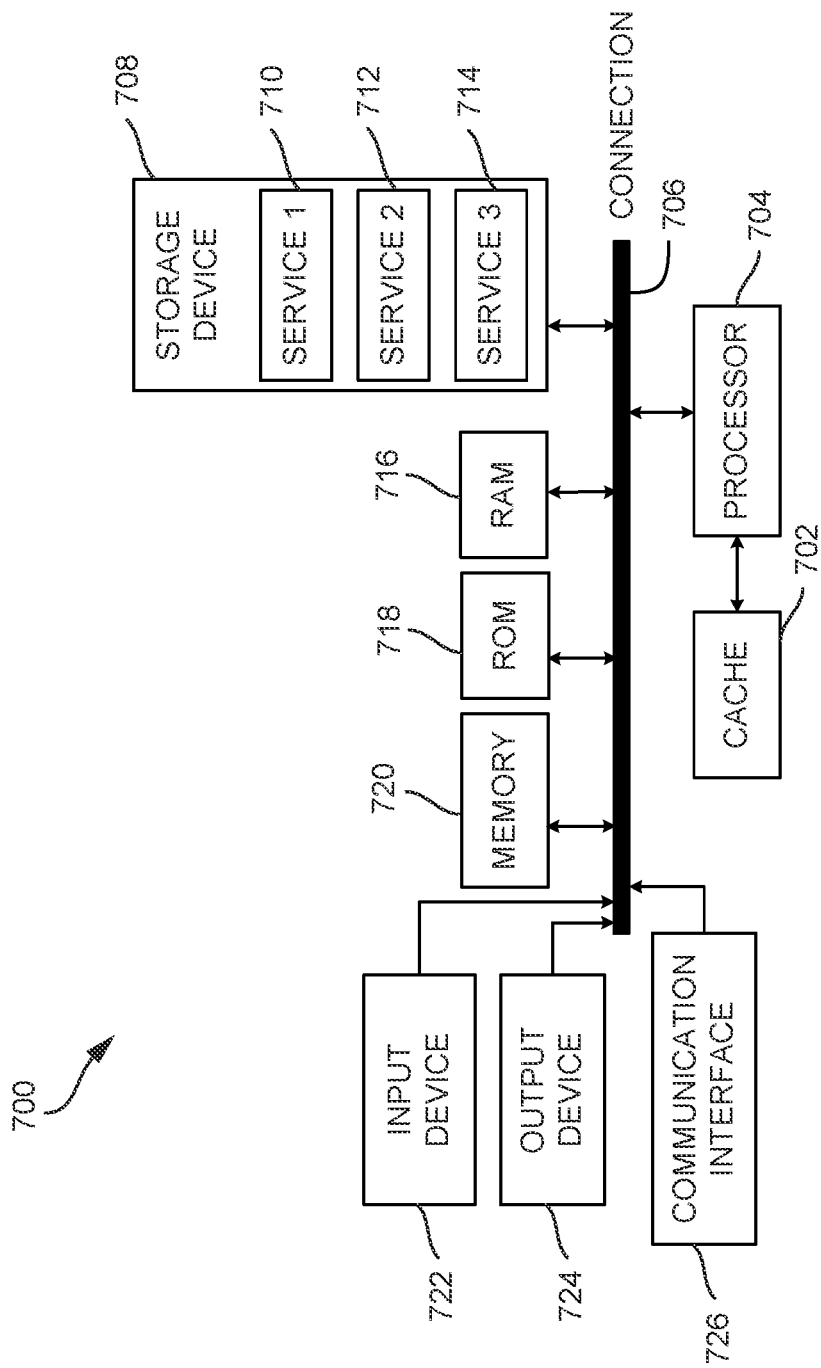
FIG. 7 illustrates an example computing device architecture of a computing device that can implement the various techniques described herein according to aspects of the present disclosure

FIG. 7 illustrates an example computing system architecture including various components in electrical communication with each other and configured to implement aspects of the present disclosure. FIG. 7 illustrates a computing system architecture 700 including various components in electrical communication with each other using a connection 706, such as a bus, in accordance with some implementations. Example system architecture 700 includes a processing unit (CPU or processor) 704 and a system connection 706 that couples various system components including the system memory 720, such as ROM 718 and RAM 716, to the processor 704. The system architecture 700 can include a cache 702 of high-speed memory connected directly with, in close proximity to, or integrated as part of the processor 704. The system architecture 700 can copy data from the memory 720 and/or the storage device 708 to the cache 702 for quick access by the processor 704. In this way, the cache can provide a performance boost that avoids processor 704 delays while waiting for data. These and other modules can control or be configured to control the processor 704 to perform various actions.

Other system memory 720 may be available for use as well. The memory 720 can include multiple different types of memory with different performance characteristics. The processor 704 can include any general-purpose processor and a hardware or software service, such as service 1 710, service 2 712, and service 3 714 stored in storage device 708, configured to control the processor 704 as well as a special-purpose processor where software instructions are incorporated into the actual processor design. The processor 704 may be a completely self-contained computing system, containing multiple cores or processors, a bus, memory controller, cache, etc. A multi-core processor may be symmetric or asymmetric.

To enable user interaction with the computing system architecture 700, an input device 722 can represent any number of input mechanisms, such as a microphone for speech, a touch-sensitive screen for gesture or graphical input, keyboard, mouse, motion input, speech and so forth. An output device 724 can also be one or more of a number of output mechanisms known to those of skill in the art. In some instances, multimodal systems can enable a user to provide multiple types of input to communicate with the computing system architecture 700. The communications interface 726 can generally govern and manage the user input and system output. There is no restriction on operating on any particular hardware arrangement and therefore the basic features here may easily be substituted for improved hardware or firmware arrangements as they are developed.

Storage device 708 is a non-volatile memory and can be a hard disk or other types of computer readable media which can store data that are accessible by a computer, such as magnetic cassettes, flash memory cards, solid state memory devices, digital versatile disks, cartridges, RAMs 716, ROM 718, and hybrids thereof.

The storage device 708 can include services 710, 712, 714 for controlling the processor 704. Other hardware or software modules are contemplated. The storage device 708 can be connected to the system connection 706. In one aspect, a hardware module that performs a particular function can include the software component stored in a computer-readable medium in connection with the necessary hardware components, such as the processor 704, connection 706, output device 724, and so forth, to carry out the function.

The following examples described various aspects of the present disclosures. Any reference to a series of examples is to be understood as a reference to each of those examples disjunctively (e.g., "Examples 1-4" is to be understood as "Examples 1, 2, 3, or 4").

Example 1 is a method comprising: receiving an indication that a value of a resource is less than a threshold, the value of the resource representing a quantity of resources associated with a communication network of a domain; transmitting, to a set of computing devices, a request for resources associated with the set of computing devices, the request including an identifier of the domain; receiving an identification of a subset of the set of computing devices that approve the request for the resources; and facilitating allocation of the resources associated with the subset of the set of computing devices to the communication network by causing a connection to be established between the subset of the set of computing devices and the communication network.

Example 2 is the method of any of example(s) 1 and 3-11, wherein the request includes an identification of a time interval over which access to the resources is requested.

Example 3 is the method of any of example(s) 1-2 and 4-11, wherein the request includes an identification of when the resources are to be allocated to the communication network.

Example 4 is the method of any of example(s) 1-3 and 5-11, further comprising: receiving an indication that a time interval associated with the request for the resources has expired; and freeing a resource associated with a computing device of the subset of the set of computing devices.

Example 5 is the method of any of example(s) 1-4 and 6-11, further comprising: receiving an indication that an updated value of the resources is less than the threshold; and transmitting, to the subset of the set of computing devices, a new request for resources associated with the subset of the set of computing devices, the new request for the resources enabling the resources associated with the subset of the set of computing devices to remain allocated after a time interval expires.

Example 6 is the method of any of example(s) 1-5 and 7-11, wherein the value of the resources is determined based on a ratio of a size of a communication queue to a quantity of resources allocated to the communication network.

Example 7 is the method of any of example(s) 1-6 and 8-11, wherein the indication that the value of the resources is less than the threshold is generated based on a machine-learning model configured to predict future resource consumption of the communication network.

Example 8 is the method of any of example(s) 1-7 and 9-11, wherein the machine-learning model is trained to predict a quantity of resources consumed by the communication network over a time interval based on one or more detected events.

Example 9 is the method of any of example(s) 1-8 and 10-11, wherein the request for the resources associated with the set of computing devices is generated by a machine-learning model trained to maximize a quantity of computing devices that approve the request.

Example 10 is the method of any of example(s) 1-9 and 11, wherein computing devices of the set of computing devices are selected based on historical allocations of resources to the communication network.

Example 11 is the method of any of example(s) 1-10, wherein computing devices of the set of computing devices are selected based on an association with the domain.

Example 12 is a system comprising: one or more processors; and a non-transitory machine-readable storage medium storing instructions that when executed by the one or more processors, cause the one or more processors to perform the methods of any of example(s)s 1-11.

Example 13 is a non-transitory machine-readable storage medium storing instructions that when executed by one or more processors, cause the one or more processors to perform the methods of any of example(s)s 1-11.

The disclosed system can be performed using a computing system. An example computing system can include a processor (e.g., a central processing unit), memory, non-volatile memory, and an interface device. The memory may store data and/or and one or more code sets, software, scripts, etc. The components of the computer system can be coupled together via a bus or through some other known or convenient device. The processor may be configured to carry out all or part of methods described herein for example by executing code for example stored in memory. One or more of a user device or computer, a provider server or system, or a suspended database update system may include the components of the computing system or variations on such a system.

This disclosure contemplates the computer system taking any suitable physical form, including, but not limited to a Point-of-Sale system ("POS"). As example and not by way of limitation, the computer system may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, the computer system may include one or more computer systems; be unitary or distributed; span multiple locations; span multiple machines; and/or reside in a cloud, which may include one or more cloud components in one or more networks. Where appropriate, one or more computer systems may perform without substantial spatial or temporal limitation one or more steps of one or more methods described or illustrated herein. As an example, and not by way of limitation, one or more computer systems may perform in real time or in batch mode one or more steps of one or more methods described or illustrated herein. One or more computer systems may perform at different times or at different locations one or more steps of one or more methods described or illustrated herein, where appropriate.

The processor may be, for example, be a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor. The memory can be coupled to the processor by, for example, a bus. The memory can include, by way of example but not limitation, random access memory (RAM), such as dynamic RAM (DRAM) and static RAM (SRAM). The memory can be local, remote, or distributed.

The bus can also couple the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software can be stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory herein. Even when software is moved to the memory for execution, the processor can make use of hardware registers to store values associated with the software, and local cache that, ideally, serves to speed up execution. As used herein, a software program is assumed to be stored at any known or convenient location (from non-volatile storage to hardware registers), when the software program is referred to as "implemented in a computer-readable medium." A processor is considered to be "configured to execute a program" when at least one value associated with the program is stored in a register readable by the processor.

The bus can also couple the processor to the network interface device. The interface can include one or more of a modem or network interface. It will be appreciated that a modem or network interface can be considered to be part of the computer system. The interface can include an analog modem, Integrated Services Digital network (ISDN0 modem, cable modem, token ring interface, satellite transmission interface (e.g., "direct PC"), or other interfaces for coupling a computer system to other computer systems. The interface can include one or more input and/or output (I/O) devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device.

In operation, the computer system can be controlled by operating system software that includes a file management system, such as a disk operating system. One example of operating system software with associated file management system software is the family of operating systems known as Windows® from Microsoft Corporation of Redmond, WA, and their associated file management systems. Another example of operating system software with its associated file management system software is the Linux™ operating system and its associated file management system. The file management system can be stored in the non-volatile memory and/or drive unit and can cause the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within registers and memories of the computer system into other data similarly represented as physical quantities within the computer system memories or registers or other such information storage, transmission or display devices.

The algorithms and displays presented herein are not inherently related to any particular computer or other apparatus. Various general-purpose systems may be used with programs in accordance with the teachings herein, or it may prove convenient to construct more specialized apparatus to perform the methods of some examples. The required structure for a variety of these systems will appear from the description below. In addition, the techniques are not described with reference to any particular programming language, and various examples may thus be implemented using a variety of programming languages.

In various implementations, the system operates as a standalone device or may be connected (e.g., networked) to other systems. In a networked deployment, the system may operate in the capacity of a server or a client system in a client-server network environment, or as a peer system in a peer-to-peer (or distributed) network environment.

The system may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any system capable of executing a set of instructions (sequential or otherwise) that specify actions to be taken by that system.

While the machine-readable medium or machine-readable storage medium is shown, by way of example, to be a single medium, the terms "computer readable medium", "computer readable storage medium", "machine-readable medium" and "machine-readable storage medium" should be taken to include a single medium or multiple media (e.g., a centralized or distributed database, and/or associated caches and servers) that store the one or more sets of instructions. The terms "computer readable medium", "computer readable storage medium", "machine-readable medium" and "machine-readable storage medium" shall also be taken to include any medium that is capable of storing, encoding, or carrying a set of instructions for execution by the system and that cause the system to perform any one or more of the methodologies or modules of disclosed herein.

In general, the routines executed to implement the implementations of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while examples have been described in the context of fully functioning computers and computer systems, those skilled in the art will appreciate that the various examples are capable of being distributed as a program object in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS). Digital Versatile Disks, (DVDs), etc.), among others, and transmission type media such as digital and analog communication links.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list of all examples in which a change in state for a binary one to a binary zero or vice-versa in a memory device may comprise a transformation, such as a physical transformation. Rather, the foregoing is intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

The above description and drawings are illustrative and are not to be construed as limiting the subject matter to the precise forms disclosed. Persons skilled in the relevant art can appreciate that many modifications and variations are possible in light of the above disclosure. Numerous specific details are described to provide a thorough understanding of the disclosure. However, in certain instances, well-known or conventional details are not described in order to avoid obscuring the description.

As used herein, the terms "connected," "coupled," or any variant thereof when applying to modules of a system, means any connection or coupling, either direct or indirect, between two or more elements; the coupling of connection between the elements can be physical, logical, or any combination thereof. Additionally, the words "herein," "above," "below." and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, or any combination of the items in the list.

Those of skill in the art will appreciate that the disclosed subject matter may be embodied in other forms and manners not shown below. It is understood that the use of relational terms, if any, such as first, second, top and bottom, and the like are used solely for distinguishing one entity or action from another, without necessarily requiring or implying any such actual relationship or order between such entities or actions.

While processes or blocks are presented in a given order, alternative implementations may perform routines having steps, or employ systems having blocks, in a different order, and some processes or blocks may be deleted, moved, added, subdivided, substituted, combined, and/or modified to provide alternative or sub combinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various examples described above can be combined to provide further examples.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further examples of the disclosure.

These and other changes can be made to the disclosure in light of the above Detailed Description. While the above description describes certain examples, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific implementations disclosed in the specification, unless the above Detailed Description section explicitly defines such terms. Accordingly, the actual scope of the disclosure encompasses not only the disclosed implementations, but also all equivalent ways of practicing or implementing the disclosure under the claims.

While certain aspects of the disclosure are presented below in certain claim forms, the inventors contemplate the various aspects of the disclosure in any number of claim forms. Any claims intended to be treated under 35 U.S.C. § 112(f) will begin with the words "means for". Accordingly, the applicant reserves the right to add additional claims after filing the application to pursue such additional claim forms for other aspects of the disclosure.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using capitalization, italics, and/or quotation marks. The use of highlighting has no influence on the scope and meaning of a term; the scope and meaning of a term is the same, in the same context, whether or not it is highlighted. It will be appreciated that same element can be described in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various examples given in this specification.

Without intent to further limit the scope of the disclosure, examples of instruments, apparatus, methods and their related results according to the examples of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Some portions of this description describe examples in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In some examples, a software module is implemented with a computer program object comprising a computer-readable medium containing computer program code, which can be executed by a computer processor for performing any or all of the steps, operations, or processes described.

Examples may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

The language used in the specification has been principally selected for readability and instructional purposes, and it may not have been selected to delineate or circumscribe the subject matter. It is therefore intended that the scope of this disclosure be limited not by this detailed description, but rather by any claims that issue on an application based hereon. Accordingly, the disclosure of the examples is intended to be illustrative, but not limiting, of the scope of the subject matter, which is set forth in the following claims.

Specific details were given in the preceding description to provide a thorough understanding of various implementations of systems and components for a contextual connection system. It will be understood by one of ordinary skill in the art, however, that the implementations described above may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

It is also noted that individual implementations may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included (e.g. in FIGS. 6-8). A process may correspond to a method, a function, a procedure, a subroutine, a subprogram, etc. When a process corresponds to a function, its termination can correspond to a return of the function to the calling function or the main function.

Client devices, network devices, and other devices can be computing systems that include one or more integrated circuits, input devices, output devices, data storage devices, and/or network interfaces, among other things. The integrated circuits can include, for example, one or more processors, volatile memory, and/or non-volatile memory, among other things. The input devices can include, for example, a keyboard, a mouse, a keypad, a touch interface, a microphone, a camera, and/or other types of input devices. The output devices can include, for example, a display screen, a speaker, a haptic feedback system, a printer, and/or other types of output devices. A data storage device, such as a hard drive or flash memory, can enable the computing device to temporarily or permanently store data. A network interface, such as a wireless or wired interface, can enable the computing device to communicate with a network. Examples of computing devices include desktop computers, laptop computers, server computers, hand-held computers, tablets, smart phones, personal digital assistants, digital home assistants, as well as machines and apparatuses in which a computing device has been incorporated.

The various examples discussed above may further be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable storage medium (e.g., a medium for storing program code or code segments). A processor(s), implemented in an integrated circuit, may perform the necessary tasks.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A method comprising:
   receiving an indication that a value of a resource is less than a threshold, the value of the resource representing a quantity of resources associated with a communication network of a domain;
   transmitting, to a set of computing devices, a request for resources associated with the set of computing devices, the request including an identifier of the domain;
   receiving an identification of a subset of the set of computing devices that approve the request for the resources; and
   facilitating allocation of the resources associated with the subset of the set of computing devices to the communication network by causing a connection to be established between the subset of the set of computing devices and the communication network.

2. The method of claim 1, wherein the request includes an identification of a time interval over which access to the resources is requested.

3. The method of claim 1, wherein the request includes an identification of when the resources are to be allocated to the communication network.

4. The method of claim 1, further comprising:
   receiving an indication that a time interval associated with the request for the resources has expired; and
   freeing a resource associated with a computing device of the subset of the set of computing devices.

5. The method of claim 1, further comprising:
   receiving an indication that an updated value of the resources is less than the threshold; and
   transmitting, to the subset of the set of computing devices, a new request for resources associated with the subset of the set of computing devices, the new request for the resources enabling the resources associated with the subset of the set of computing devices to remain allocated after a time interval expires.

6. The method of claim 1, wherein the value of the resources is determined based on a ratio of a size of a communication queue to a quantity of resources allocated to the communication network.

7. The method of claim 1, wherein the indication that the value of the resources is less than the threshold is generated based on a machine-learning model configured to predict future resource consumption of the communication network.

8. A system comprising:
   one or more processors; and
   a non-transitory machine-readable storage medium storing instructions that when executed by the one or more processors, cause the one or more processors to perform operations including:
      receiving an indication that a value of a resource is less than a threshold, the value of the resource representing a quantity of resources associated with a communication network of a domain;
      transmitting, to a set of computing devices, a request for resources associated with the set of computing devices, the request including an identifier of the domain;
      receiving an identification of a subset of the set of computing devices that approve the request for the resources; and
      facilitating allocation of the resources associated with the subset of the set of computing devices to the communication network by causing a connection to be established between the subset of the set of computing devices and the communication network.

9. The system of claim 8, wherein the request includes an identification of a time interval over which access to the resources is requested.

10. The system of claim 8, wherein the request includes an identification of when the resources are to be allocated to the communication network.

11. The system of claim 8, wherein the operations further include:
    receiving an indication that a time interval associated with the request for the resources has expired; and
    freeing a resource associated with a computing device of the subset of the set of computing devices.

12. The system of claim 8, wherein the operations further include:
    receiving an indication that an updated value of the resources is less than the threshold; and
    transmitting, to the subset of the set of computing devices, a new request for resources associated with the subset of the set of computing devices, the new request for the resources enabling the resources associated with the subset of the set of computing devices to remain allocated after a time interval expires.

13. The system of claim 8, wherein the value of the resources is determined based on a ratio of a size of a communication queue to a quantity of resources allocated to the communication network.

14. The system of claim 8, wherein the indication that the value of the resources is less than the threshold is generated based on a machine-learning model configured to predict future resource consumption of the communication network.

15. A non-transitory machine-readable storage medium storing instructions that when executed by one or more processors, cause the one or more processors to perform operations including:
- receiving an indication that a value of a resource is less than a threshold, the value of the resource representing a quantity of resources associated with a communication network of a domain;
- transmitting, to a set of computing devices, a request for resources associated with the set of computing devices, the request including an identifier of the domain;
- receiving an identification of a subset of the set of computing devices that approve the request for the resources; and
- facilitating allocation of the resources associated with the subset of the set of computing devices to the communication network by causing a connection to be established between the subset of the set of computing devices and the communication network.

16. The non-transitory machine-readable storage medium of claim 15, wherein the request includes an identification of a time interval over which access to the resources is requested.

17. The non-transitory machine-readable storage medium of claim 15, wherein the request includes an identification of when the resources are to be allocated to the communication network.

18. The non-transitory machine-readable storage medium of claim 15, wherein the operations further include:
- receiving an indication that a time interval associated with the request for the resources has expired; and
- freeing a resource associated with a computing device of the subset of the set of computing devices.

19. The non-transitory machine-readable storage medium of claim 15, wherein the operations further include:
- receiving an indication that an updated value of the resources is less than the threshold; and
- transmitting, to the subset of the set of computing devices, a new request for resources associated with the subset of the set of computing devices, the new request for the resources enabling the resources associated with the subset of the set of computing devices to remain allocated after a time interval expires.

20. The non-transitory machine-readable storage medium of claim 15, wherein the value of the resources is determined based on a ratio of a size of a communication queue to a quantity of resources allocated to the communication network.

* * * * *